United States Patent [19]

Weiss

[11] 3,856,546

[45] Dec. 24, 1974

[54] NON-TOXIC COMPOSITIONS FOR USE IN PRIMER COATING FORMULATIONS

[75] Inventor: Gerald L. Weiss, Freehold, N.J.

[73] Assignee: N L Industries, Inc., New York, N.Y.

[22] Filed: Aug. 1, 1972

[21] Appl. No.: 277,139

[52] U.S. Cl............... 106/300, 106/308 B, 106/309
[51] Int. Cl.......................... C09c 1/36, C08h 17/04
[58] Field of Search............ 106/300, 308 Q, 308 B, 106/309

[56] References Cited
UNITED STATES PATENTS

| | | | |
|---|---|---|---|
| 2,233,358 | 2/1941 | Nutting | 106/300 |
| 2,297,523 | 9/1942 | Allan et al. | 106/300 |
| 3,383,231 | 5/1968 | Allan | 106/300 |

*Primary Examiner*—J. Poer
*Assistant Examiner*—J. V. Howard

[57] ABSTRACT

Non-toxic tin compositions are added to latex-base primer coating formulations to incorporate stannous ions therein, which ions combine with the staining agents of a cedar or redwood substrate in a manner to prevent staining of a top coat of paint applied to the substrate.

7 Claims, No Drawings

NON-TOXIC COMPOSITIONS FOR USE IN PRIMER COATING FORMULATIONS

BACKGROUND OF THE INVENTION

One of the problems that has continued to vex paint manufacturers has been the discoloration of a paint due to the bleeding of stain producing agents from wood substrates. This discoloration has been especially serious when latex-base primer coatings are applied to wood substrates such as cedar and redwood. Heretofore, success in overcoming this problem has been achieved by incorporating lead compounds in the latex-base primers. However, in view of the toxicity of lead, a concerted effort is now underway, internationally, to ban the use of lead compounds in latex-base coating compositions. It is necessary, therefore, to provide a suitable substitute for lead as means of preventing discoloration in house paints and especially those applied to cedar and redwood substrates.

SUMMARY OF THE INVENTION

It has now been discovered that the staining of house paints and the like, due to leaching of the staining agents from cedar and redwood substrates, can be overcome by incorporating stannous ions in a latex-base primer coating applied to the substrate. More particularly, it has been found that the stannous ions may be derived from non-toxic compositions which include: (1) stannous oxides formed by partially neutralizing stannous salts of inorganic acids such as hydrochloric and sulfuric acids; and (2) the stannous salts of certain carboxylic acids including formic, acetic, and oxalic acids.

It will be understood, however, that the invention is not limited to the particular tin compositions enumerated above; and that the term "tin composition", as used herein and in the attached claims, is comprehensive of any tin composition capable of introducing stannous ions in a latex-base primer.

The tin compositions produced by partial neutralization of the stannous salts of sulfuric and hydrochloric acids comprise essentially hydrous stannous oxide, unreacted-soluble stannous salts of said inorganic acids, i.e., stannous sulfate or stannous chloride, as the case may be, and alkali metal salts of said acids. The unreacted, soluble stannous salts are sorbed with the hydrous stannous oxide and in this sense, the latter may be regarded as a carrier for the soluble stannous salts—such that when the carrier is added to the latex-base primer formulation, the soluble stannous salts are released and form stannous ions therein which ions react with the staining agents of the cedar or redwood substrate to form insoluble compounds thereby preventing staining of a top coat of paint.

Also, it has been found that certain organic tin compositions, and in particular, the salts of carboxylic acids, such as formic, oxalic and acetic acids, and the like, when introduced into a latex-base primer formulation, provide stannous ions which combine with the staining agents to prevent staining.

These non-toxic inorganic and organic tin compositions may be added to a latex-base primer coating formulation in any one of several ways as, for example, as directed additives to the primer formulation; or as a treatment of the components used in a primer formulation, such components being, for example, $TiO_2$ pigment, talc, clay, cellulose, amorphous silica and the like.

With respect to treatment of the $TiO_2$ component of a latex-base primer, this may be effected in several ways as, for example, by intimate association with, or coating of, a commercial grade $TiO_2$ pigment with a tin composition; by intimately associating a tin composition with $TiO_2$ calciner discharge, which may or may not be coated with hydrous oxides such as alumina, silica, titania and the like, using conventional treatment techniques; or by adding $TiO_2$ calciner discharge, having freshly deposited coating of alumina, silica, titania or mixture thereof, to an aqueous solution of a tin composition as, for example, stannous sulfate.

Concerning the other components used in primer formulations, i.e., talc (magnesium silicate), clay, amorphous silica and the like, these may be treated similarly with the inorganic or organic tin compositions of this invention in the manner described below and used in typical latex-base primer formulations to prevent cedar staining.

Further, the tin compositions of this invention may be prepared independently of the components of a primer formulation. These tin compositions, which are finely divided, dry, powdery materials, may be added directly to a latex-base primer formulation; or may be mechanically mixed with a component of the primer formulation and the mixture added thereto.

Of the several sources of stannous ions for preventing staining, the non-toxic tin compositions comprising partially neutralized salts of inorganic acids such as HCl, and $H_2SO_4$ are most attractive from the standpoint of handling, effectiveness and cost. In this connection, it was discovered at the outset that although a commercially available stannous salt such as stannous chloride or stannous sulfate may prevent staining when added to a latex-base primer formulation, they produce a pronounced bodying effect, i.e., the paint becomes so thick or stiff as to be unspreadable by normal brushing.

While the exact reason for this is not understood, it is postulated that due to the low pH of these stannous salts, the pH of the primer formulation is lowered such that thickening occurs. In any event, it has now been found that when the stannous salts of hydrochloric or sulfuric acids are only partially neutralized such that the pH of the salt is retained in the range of from about 3 to about 4.5 but not above about 7, they form tin compositions which, when added to a latex primer formulation, do not effect bodying and do provide stannous ions which react with the organic staining complexes of the cedar or redwood substrate to form insoluble compounds and hence prevent staining of a topcoat of paint applied over the primer.

In this connection, however, it has been found, quite unexpectedly, that a commercially available stannous salt of an inorganic acid may be used as a source of stannous ions provided the salt is intimately associated, with the $TiO_2$ component of a latex-base primer, which $TiO_2$ component has a freshly deposited coating of hydrous oxide or oxides such as alumina, titania, silica and the like. It is postulated that there may be sufficient hydroxyl groups in the oxide coating to effect partial neutralization of the stannous salt. In any event, the pH of the suspension will generally be in the range specified above as a consequence of which the precipitated stannous oxide will contain sufficient sorbed stannous salt to provide stannous ions in a primer formulation.

As pointed out above, other sources of stannous ions include stannous salts of certain water-soluble organic acids. These organic acids are those referred to generally as water-soluble carboxylic acids and in particular mono and dicarboxylic acids including formic, oxalic and acetic acids. These acids, when converted to stannous salts and incorporated in a latex-base primer formulation provided stannous ions which react with the staining agents of cedar or redwood substrate to form insoluble compounds and as such prevent staining.

Preparation of the stannous salts of organic acids, depends somewhat on the type of organic acid used. Thus in preparing the stannous salt of formic acid, that is to say stannous formate, a solution of formic acid is first deoxygenated by sparging with oxygen-free nitrogen. To this solution is added enough stannous oxide to form a slurry of about 4 percent solids. This slurry is heated and refluxed in an oxygen-free atmosphere until the solution turns from a dark gray to a tan color. It is then filtered, while hot, and the filtrate cooled to precipitate stannous formate which is recovered, washed with alcohol and ether, and dried over potassium hydroxide in a vacuum to form a finely divided powder.

Stannous acetate may be prepared by adding a stannous oxide to a solution of acetic acid to form a slurry which is deoxygenated by sparging with oxygen-free nitrogen. The slurry is heated and refluxed in a nitrogen atmosphere until a yellowish brown mixture is obtained. This mixture is filtered and the filtrate collected, evaporated and dried over potassium hydroxide in a vacuum to form a dry finely-divided powder.

It has been found also that a commercial grade of stannous oxylate will, when added to a latex-base primer formulation provide sufficient stannous ions in solutions to combine with the staining agents of a cedar or redwood substrate to prevent staining.

For typical, latex-base primer formulations such as an acrylic latex primer, a polyvinyl acetate copolymer primer, and alkyd modified acrylic primers, and the like, the amount of tin composition, as precipitated hydrous stannous oxide, required to prevent staining is at least about 0.03 pound, calculated as SnO, per gallon of primer. When the hydrous stannous oxide is precipitated on unfinished $TiO_2$ pigment, i.e., untreated $TiO_2$ calciner discharge or calciner discharge treated with the usual hydrous metal oxides, somewhat higher amounts such as 0.08 pound per gallon of primer, corresponding to about 4.5 percent calculated as SnO on a $TiO_2$ weight basis, is preferred; and while an amount as high as about 0.34 pound, calculated as SnO, per gallon of primer, corresponding to about 17 percent SnO on a $TiO_2$ pigment weight basis, insures optimum results higher amounts, though effective, become uneconomical.

Concerning the minimal amounts of tin compositions that may be used successfully there are at least two controlling factors, the one being the reactivity of the primer component for increasing the availability of the stabilized stannous ions in the primer; the other being the surface area of the primer component, a component the surface area of which has been increased by milling or grinding requiring lesser amounts of the tin composition.

PREFERRED EMBODIMENT OF THE INVENTION

Of the various methods that may be used to add the tin compositions of this invention to a primer, the preferred method is that of slurrying $TiO_2$ calciner discharge freshly coated with hydrous oxides of aluminum, silicon, titanium and the like, or mixtures thereof, with an aqueous solution of a stannous compound, such as for example, commercial grade stannous chloride or stannous sulfate, with stirring, to coat the pigment with a hydrous stannous oxide containing unreacted stannous salt which, when added to a primer formulation provides sufficient stannous ions therein to prevent staining.

More particularly, $TiO_2$ calciner discharge is slurried in water from 25 to 30 percent solids and treated with water-soluble salts of titanium and/or silicon and/or aluminum as the case may be, using treatment techniques well known in the art, followed by the addition of a neutralizing agent such as sodium or ammonium hydroxide to adjust the pH of the slurry in a range of from about 7 to 9 and precipitate one or more of the corresponding hydrous metal oxides onto the $TiO_2$ pigment. The pigment suspension is then filtered and washed to provide a $TiO_2$ filter cake. An aqueous solution of a stannous salt of an inorganic acid, such as hydrochloric or sulfuric acid is prepared by adding the salt to an aqueous solution of the corresponding acid; and the aforesaid $TiO_2$ filter cake is then slurried with the aqueous salt solution. In general, the pH of the resulting suspension will range from about 3 to about 4.5 and a tin composition comprising hydrous stannous oxide and unreacted stannous salt will precipitate from the partially neutralized stannous salt solution onto the treated $TiO_2$ pigment—which is then filtered, dried and milled. Milling may be done by micropulverizing but is preferably done by steam micronizing. The finished $TiO_2$ pigment is then added to a latex-base primer as a substitute for all or a fraction of the $TiO_2$ normally used.

The amount of tin composition used may vary depending on the end use of the pigment. When pigment and tin compositions are to be intimately associated in the preferred manner described above, the tin concentration of the stannous salt solution is such as to provide about 7.0 percent precipitated hydrous stannous oxide, calculated as SnO, on the pigment — since it has been found that substituting a $TiO_2$ pigment coated with about 7 percent hydrous stannous oxide, as SnO, for substantially all of the $TiO_2$ normally used in a typical primer composition effectively prevents cedar staining. However, when using an alternative procedure wherein the stannous salt is added to an aqueous slurry of $TiO_2$, followed by neutralization, about 17 percent hydrous stannous oxide, calculated as SnO is required. Moreover, when using a $TiO_2$ pigment treated with 17 percent hydrous stannous oxide, as little as about 25 percent of the amount of $TiO_2$ pigment normally used in a primer formulation will be effective in preventing cedar staining. Or conversely, staining may be substantially prevented by treating 100 percent of the $TiO_2$ in the primer with about 4.9 percent hydrous stannous oxide, calculated as SnO, on a product weight basis.

While the preferred embodiment of the invention combines precipitation of the tin composition on $TiO_2$ calciner discharge treated with hydrous metal oxides such as titania and/or alumina and/or silica and mixtures thereof, it will be understood that the tin composition may be coated on $TiO_2$ calciner discharge having no previous treatment with hydrous metal oxides and/or silica.

The invention also contemplates other techniques for treating the $TiO_2$ pigment component of a primer formulation so as to incorporate stannous ions therein. This, a finished $TiO_2$ pigment such as a commercial grade of $TiO_2$ presently used in primer compositions as a component thereof, may be coated or otherwise intimately associated with the tin composition, comprising substantially 17 percent hydrous stannous oxide, as SnO, and then added to the primer formulation. To this end an aqueous slurry of a commercial grade $TiO_2$ pigment is prepared, preferably of from 25 to 30 percent solids, and to this slurry is added an aqueous solution of an inorganic stannous salt such as hydrous stannous chloride or hydrous stannous sulfate in water; thereafter sodium hydroxide, ammonium hydroxide or other suitable neutralizing agent is added to the mixture to adjust the pH in the range of from about 3 to 4.5 whereupon a tin composition comprising essentially hydrous stannous oxide and unreacted stannous salt is precipitated on or in intimate association with the $TiO_2$ pigment. The treated $TiO_2$ slurry is then filtered to provide a filter cake which is washed to remove some but not all of the stannous salt and dried at a temperature in the range from 45°–165°C. The treated $TiO_2$ is then milled to provide a finished product which may be substituted for the usual $TiO_2$ pigment component of a primer coating composition; or may be used in lieu of the lead oxide previously used in latex formulations to prevent cedar staining.

The tin compositions of this invention were tested for cedar stain control in acrylic latex, polyvinyl acetate and alkyd latex primer formulations typical of which are the following:

FORMULATION A

| | POUNDS/GAL. PRIMER |
|---|---|
| Water | 1.4 |
| BENTONE LT | 0.04 |
| KTPP (Potassium Tri-polyphosphate) | 0.009 |
| Daxad 30 (Sodium Salt Polyelectrolyte) | 0.06 |
| Triton X100 (Glycol Condensate) | 0.04 |
| Colloid 677 (Defoamer) | 0.009 |
| PMB (Mercurial Fungicide) (Phenyl Mercuric Borate) | 0.018 |
| TITANOX ($TiO_2$) | 2.08 |
| Lorite (20% Diatomacious Silica) (80% $CaCO_3$) | 1.19 |
| (Mix in a high speed disperser, i.e., Cowles Disperser for 15 minutes) | |
| Water | 0.71 |
| Rhoplex AC-35 (Acrylic Latex Emulsion-46.5% Solids) | 5.0 |
| Pine Oil | 0.067 |
| Ethylene Glycol | 0.28 |
| Colloid 677 (Defoamer) | 0.009 |
| $NH_4OH$ (28%) | 0.018 |

FORMULATION B

| | POUNDS/GAL. PRIMER |
|---|---|
| Water | 1.51 |
| Daxad 30 (Sodium Salt Polyelectrolyte) | 0.077 |
| QP 4400 (Hydroxyethyl Cellulose Thickener) | 0.036 |
| Polyglycol P1200 (Defoamer) | 0.027 |
| Tergitol NPX (Non-ionic Wetting Agent) | 0.036 |

FORMULATION B —Continued

| | POUNDS/GAL. PRIMER |
|---|---|
| Butyl Cellosolve Acetate (Coalescing Solvent) | 0.13 |
| Ethylene Glycol | 0.36 |
| TITANOX ($TiO_2$) | 1.60 |
| Barytes X-10-R (Barium Sulfate) | 1.70 |
| PMB (Phenyl Mercuric Borate) | 0.045 |
| (Mix in a high speed disperser, i.e., Cowles Disperser for 15 minutes) | |
| Water | 0.75 |
| Everflex BG (Polyvinyl Acetate Copolymer) | 4.99 |

FORMULATION C

| | POUNDS/GAL. PRIMER |
|---|---|
| Water | 0.40 |
| Tamol 850 (anionic dispersant | 0.065 |
| KTPP (Potassium Tri-polyphosphate) | 0.015 |
| Nopco NXZ (Defoamer) | 0.01 |
| Ethylene Glycol | 0.35 |
| Super-Ad-It (Mercurial Fungicide) | 0.018 |
| QP 15000 (2.5%) (HEC Thickner) | 0.80 |
| TITANOX ($TiO_2$) | 1.50 |
| Silver Bond B (Silica extender) | 1.53 |
| (Mix in high speed disperser, i.e., Cowles Disperser for 15 minutes) | |
| Rhoplex AC-388 (acrylic latex—50% solids) | 4.39 |
| Alkyd 1266-M-70 (Long oil soya alkyd—70% solids) | 0.26 |
| Nopco NXZ (Defoamer) | 0.01 |
| Tributyl Phosphate | 0.10 |
| Water | 1.23 |

FORMULATION D

| | POUNDS/GAL. PRIMER |
|---|---|
| Water | 2.04 |
| Preservative (Super-Ad-It, Nuodex Division) | .06 |
| Antifoam Agent (Nopco NXZ, Nopco Chemical Co.) | .02 |
| Ethylene Glycol | .27 |
| Ammonium Hydroxide (28%)1 | .01 |
| Thickener (Methocel HG-DG, Dow Chemical Co.) | .03 |
| Potassium Tripolyphosphate (20% sol.) | .05 |
| Dispersant (Tamol 850, Rohm & Haas Co.) | .04 |
| Component - (Pigment - $TiO_2$) | 2.0 |
| (Extender - talc, clay amorphous silica) | 1.0 |
| Surfactant (Igepal CO 630, GAF Corporation) | .05 |
| Coalescing Agent (Texanol, Eastman Chem. | .07 |
| Acrylic Emulsion (50% Solids - Rhoplex AC-388 Rohm & Haas Co.) | 4.6 |
| Long Oil Alkyd (100% Solids) | .41 |
| Zirco Catalyst (6% Zr.) | .005 |
| Cobalt Naphthenate (6% Co.) | .005 |

It will be understood, however, that the above formulations are illustrative and not limiting of the invention and that the use of the tin compositions of this invention in other primer formulations to prevent cedar staining is contemplated within the scope of the invention.

TEST FOR STAIN CONTROL

The following procedure was used to test the effectiveness of the stabilized hydrous stannous oxides of this invention for preventing cedar staining when incorporated in a primer formulation of the type described above.

A stabilized hydrous stannous oxide was introduced into a primer formulation using the techniques described above. The primer was then applied to a piece of cedar siding as a stripe or band across the width thereof. After the primer had dried, a band of white latex finish paint was applied across the primer. The staining, if any, of the dried top coat of the test specimen was evaluated as "definite" "trace" or "none".

ACCELERATED EXPOSURE TEST

To verify the relative long-term cedar stain hold-out characteristics of the test specimens the latter were exposed in a high humidity cabinet for 72 hours at 100°F at the end of which time the test specimens were again examined for change in color of the top coat. The following examples will serve to further illustrate the invention.

EXAMPLE 1

A non-toxic tin-treated $TiO_2$ component for use in a latex primer to prevent cedar staining was prepared by first milling $TiO_2$ calciner discharge and then adding it to water to form a slurry of 30 percent solids. To this slurry were added soluble salts of titanium, silicon and aluminum in amounts to provide predetermined amounts of the corresponding hydrous metal oxides on the $TiO_2$ pigment using the procedures well known in the art. Thereafter, sodium hydroxide was added to adjust the pH of the slurry in the range of from 7 to 7.6. To this slurry was then added a 20 percent solution of stannous sulfate which had been prepared in a separate tank by adding stannous sulfate to water at 25°C, acidified with sulfuric acid to a pH of 1.5.

This stannous sulfate solution was added to the $TiO_2$ slurry in the slurry treatment tank at 25°C over a period of about 20 minutes and in an amount to provide about 17 percent SnO on a product weight basis. Thereafter, the slurry was agitated for 1 hour at 25°C whereupon a 50 percent solution of sodium hydroxide was added to adjust the pH to 2.9. After further agitation at 25°C for one hour, additional 50 percent solution of sodium hydroxide was added to adjust the pH to 3.8. . This was followed by further agitation for 15 minutes at 25°C whereupon the slurry was filtered and washed until the specific resistance of the filtrate was about 400 ohm centimeter. The washed filter cake was then dried to 3 percent or less volatile matter followed by micropulverizing. The amount of tin composition, i.e., hydrous stannous oxide including sorbed stannous sulfate on the treated $TiO_2$ pigment was such that when substituted for the $TiO_2$ component normally used in primer formulation "D", the amount of stannous oxide added calculated as SnO, was about 0.34 lbs. per gallon of primer. When tested for stain control, in the manner described above, the primer effectively prevented cedar staining.

EXAMPLE 2

A similar $TiO_2$ pigment was made using the technique described in Example 1, but in this experiment as little as 25 percent of the tin-treated pigment was used to replace a corresponding amount of the $TiO_2$ pigment normally used in the primer formulation which amount was equivalent to about 0.085 lbs., hydrous stannous oxide, calculated as SnO, per gallon of primer. Again, when the primer was tested for staining, it effectively prevented cedar stain of the top coat.

EXAMPLE 3

In this example, the procedure of Example 1 was substantially reversed. Thus, $TiO_2$ calciner discharge was added to water to form a slurry of 25 percent solids at 60°C. To this slurry were added, successively, 1.2 percent $H_2SO_4$, as 20–25 percent $H_2SO_4$ solution, a total of 4.7 percent $SiO_2$ as sodium silicate, and a total of 3.95 percent $Al_2O_3$, as aluminum sulfate, after which the pH was adjusted to 7.6 to 8.8 with sodium hydroxide. The slurry was then filtered to form a filter cake.

A stannous sulfate solution (11.8 percent SnO) prepared by adding 192 ml $H_2SO_4$ (96.4 percent) to 35 liters water to which solution was added 18,610 gms. $SnSO_4$. Additional water was then added to adjust final volume to 70.5 liters.

This stannous sulfate solution was then transferred to a tank to which was added the aforesaid filter cake followed by mixing to thoroughly repulp the $TiO_2$ in the $SnSO_4$ solution. The pH of the slurry stood at about 1.9 whereupon a tin composition comprising hydrous stannous oxide with sorbed stannous sulfate precipitated as the hydrous oxide coated $TiO_2$. The slurry was then deliquored, dried and steam micronized. When tested in primer formulation, as in Example 1, there was no evidence of cedar stain.

EXAMPLE 4

Another non-toxic cedar-staining preventing component for primer formulations was prepared by first slurrying a commercial grade $TiO_2$ pigment in water at 25°C to form a slurry of 20 percent solids. To this slurry was added a stannous chloride solution at 25°C over a period of 5 minutes in an amount to provide about 17 percent SnO on a product weight basis, the stannous chloride solution being made by dissolving hydrated stannous chloride ($SnCl_2.2H_2O$) in water at 50°C to a stannous chloride concentration of 51 percent by weight. To this suspension was added sodium hydroxide at 100 gpl to adjust the pH of the slurry to 4.2. The suspension was held at 25°C for 1 hour and thereafter filtered and washed with a volume of water about equal to the volume of suspension to remove some, but not all, of the sodium chloride, the washing being terminated when the specific resistance of the filtrate reached 205 ohm centimeter. The filter cake was then dried at 25°C and micropulverized. This tin composition comprised hydrous stannous oxide and sorbed stannous chloride, and was intimately associated with the $TiO_2$ pigment in an amount such that when the latter was added to a typical primer formulation, i.e., formulations A, B, and C as replacement of the TITANOX component, the amount of hydrous stannous oxide was about 0.34 lb. calculated as SnO per gallon primer. When this primer was tested for cedar stain prevention, no stain was visible in the top coat of paint. Moreover, when subjected to the accelerated exposure test described above, there was no change in color of the top coat.

EXAMPLE 5

Another experiment was made using substantially the same procedure as described in Example 4 except that a stannous sulfate solution at 25°C was added to the pigment slurry over a period of 5 minutes. The stannous sulfate solution was prepared by dissolving stannous sulfate in water at 25°C to a stannous sulfate concentration of 20.0 percent by weight. Sodium hydroxide was added to the slurry to adjust the pH of the slurry to 4.2 and precipitate hydrous stannous oxide including sorbed stannous sulfate on the $TiO_2$ pigment. After filtration, washing, and drying and micropulverizing the treated pigment was incorporated in a typical primer formulation such as identified above, as replacement of the TITANOX compound thereof and the primer tested for cedar staining. No stain was visible in the top coat of paint even after subjecting the test specimen to the accelerated exposure test.

EXAMPLE 6

Three additional experiments were made in which the usual extender components of primer formulation D were intimately associated with the tin compositions, i.e., hydrous stannous oxides prepared as described in the preceeding examples.

Thus a cellulose component was repulped in water at 25°C to 5.25 percent solids. To this slurry was added a stannous chloride solution at 25°C over a period of 5 minutes in the mass ratio of SnO/cellulose of about 9.0 — the stannous chloride solution prepared by dissolving hydrous stannous chloride in water at 50°C at a stannous chloride concentration of 53 percent by weight. After mixing for 30 minutes at 25°C a solution of sodium hydroxide at 100 gpl was added to adjust the pH to 7.0. Thereafter, the slurry was filtered, washed, dried at 25°C and treated component air micronized. The amount of hydrous stannous oxide on the cellulose was such that when the cellulose was added to primer formulation D, as replacement of the cellulose, the amount of stannous oxide was about 0.34 lb., calculated as SnO, per gallon primer. When this primer was tested, it was found to effectively prevent cedar staining.

In another experiment, the component used was a clay extender identified commercially as ASP-170 made by Englehardt Minerals and Chemical Corporation. The clay extender was treated with a solution of stannous chloride which was prepared as described above having a stannous chloride concentration of 36 percent by weight. It was added in an amount such that when the extender was added to the primer formulation D, there would be 0.24 lb. of SnO per gallon latex base formulation. The pH of the treated clay slurry was adusted to 4.2 by the addition of sodium hydroxide and the filter cake was dried at 30°C. The treated clay recovered was substituted for the clay extender in the above-identified formulation and the latter tested for staining. No stain was detected.

Still another experiment using the procedure of the preceeding examples was made except that the component treated was a talc extender, that is, magnesium silicate; and the tin composition precipitated on the talc was derived from a solution of stannous sulfate prepared as described in Example 5 supra. This product had a stannous oxide treatment of 17 percent. The amount of product added to the primer was such that when the latter was substituted for the magnesium silicate in a primer formulation of the type described above, the amount of hydrous stannous oxide in said formulation was 0.09 lb. calculated as SnO, per gallon primer. When tested for cedar staining, the primer formulation effectively prevented staining in top coat and the test specimen showed no change in color after being subjected to an atmosphere of high humidity for 72 hours at 100°F.

EXAMPLE 7

A stannous compound was prepared as a dry powder by adding commercially available hydrated stannous chloride to 0.1 N HCl in an amount such that the tin concentration of the resulting solution, calculated as SnO, was 18 percent by weight. This solution was diluted by water to 7.4 percent SnO and this dilute solution was partially neutralized by adding ammonium hydroxide in an amount such that the pH of the resulting slurry was 3.8. The slurry was agitated for 10 minutes after which it was filtered, and the filter cake washed with a volume of water equal to the volume of slurry, dried at a temperature of 45°C and then milled by micropulverizing to form a finely divided powder. This finely divided stabilized hydrous stannous oxide was then added directly to a primer formulation in an amount to provide about 0.1 lb. stabilized stannous oxide, calculated as SnO, per gallon primer formulation; and thereafter the primer formulation was applied to a substrate of cedar wood and tested for its ability to prevent staining using the test procedure described above. The top coat of paint applied to the primer showed no stain.

EXAMPLE 8

An additional experiment was run to illustrate the effectiveness of stannous compounds prepared from organic acids. Thus, a stannous acetate prepared as described above was added to primer formulation D, in an amount corresponding to about 0.1 lb. stannous oxide per gallon primer. When tested for cedar staining, the primer effectively prevented cedar staining of the top coat.

EXAMPLE 9

Another experiment was run in which stannous formate, prepared as described above, was added directly to the primer formulation D in an amount corresponding to about 0.05 lb. stannous oxide per gallon of the formulation. When tested as described above, the primer effectively prevented cedar staining.

EXAMPLE 10

Still another experiment was run using stannous formate as treatment on amorphous silica. To this end, the amorphous silica was added to a stannous formate solution at a temperature of about 100°C, in an amount to form a 10 percent slurry of the silica. The slurry was allowed to cool to room temperature while being agitated after which it was filtered and the filter cake washed with alcohol then ethyl ether and finally dried at room temperature over potassium hydroxide in a vacuum. The dry product was then crushed and screened to a uniform particle size and thereafter substituted for the extender of primer formulation D. When tested for staining, the primer effectively prevented staining of the top coat of paint.

EXAMPLE 11

In this experiment, the stannous salt was a stannous oxalate. An aqueous slurry of 25 percent stannous oxalate was prepared and neutralized with ammonia to a pH of 8.5. This slurry was added to a latex-base primer composition in an amount to provide 0.15 lb., calculated as SnO, per gallon of primer. When tested for cedar staining, there was only a trace staining of the top coat.

EXAMPLE 12

Stannous oxide was prepared from a 5 percent solution of hydrated stannous chloride which was neutralized with 10 percent sodium hydroxide to a pH of 8.5 and held at a pH of 8.5 for an hour. The slurry was filtered, washed with water, and the filter cake dried at room temperature and air milled. The stannous oxide, prepared as described above, was added in an amount to provide 0.75 lb. stannous oxide, as SnO, in a primer formulation and the latter tested for cedar staining. However, due to the relatively high pH [8.5] the stannous chloride was connected completely to SnO and hence, no stannous ions were present in the primer formulation to prevent staining of the top coat of paint.

EXAMPLE 13

In this example, the $TiO_2$ pigment used as the pigment component of a primer formulation was treated with a commercial grade stannous chloride. To this end, a $TiO_2$ slurry of 20 percent solids was treated with 7 percent stannous oxide. This slurry was neutralized with 10 percent sodium hydroxide to a pH of 8.5 and finished as described in Example 1. Two pounds of this product were added as the $TiO_2$ pigment component of the primer formulation given above, but again the high pH of the stannous oxide treated $TiO_2$ precluded the release of stannous ions in the primer and hence the treated $TiO_2$ pigment was ineffective in preventing staining of the top coat of paint.

From the foregoing description and examples, it is evident that the non-toxic tin compositions of this invention and in particular those prepared from partially neutralized salts of hydrochloric or sulfuric acid; or the salts of certain carboxylic acids such as formic, acetic and oxalic acids, when added to or intimately associated with components of a primer formulation, in lieu of the usual lead compounds, are effective in preventing the staining agents of a cedar or redwood substrate from migrating through the latex-base primer and staining a top coat of paint applied thereto; and that the use of these non-toxic tin compositions is a safe, economical and effective substitute for the more toxic lead compounds heretofore used.

The invention may be carried out in other specific ways than those herein set forth without departing from the spirit and essential characteristics of the invention and the present embodiments are to be considered in all respects illustrative and not restrictive and all changes coming within the meaning and equivalency range of the appended claims are intended to be embraced therein.

I claim:

1. A component for use in a primer formulation adapted to be applied to cedar or redwood substrates to prevent staining said component intimately associated with a non-toxic tin composition comprising from 4.9 to 7.0 percent hydrous stannous oxide, calculated as SnO, containing absorbed, unreacted stannous salt yielding stannous ions in said primer formulation for reacting with the staining agents of said cedar or redwood substrates to form insoluble compounds with said agents.

2. A component for use in a primer formulation according to claim 1 wherein said component is $TiO_2$ pigment and said unreacted stannous salt is selected from the group consisting of stannous salts of sulfuric and hydrochloric acids.

3. A component for use in a primer formulation according to claim 2, wherein said $TiO_2$ pigment has a coating thereon of hydrous oxides selected from the group consisting of alumina, titania, silica, and mixtures thereof.

4. A method for preparing a non-toxic stain inhibiting component for use in primer formulations adapted to be applied to cedar or redwood substrates comprising the steps of: preparing an aqueous slurry of said component, preparing an aqueous solution of stannous salt selected from the group consisting of stannous salts of sulfuric and hydrochloric acids, intimately associating said slurry and said stannous salt solution and adjusting the pH of the resulting mixture, when necessary, within the range of from 3 to 4.5 to precipitate a non-toxic tin composition on said component comprising from 4.9 to 7.0 percent hydrous stannous oxide, calculated as SnO, containing absorbed, unreacted stannous salt yielding stannous ions in said primer formulation and thereafter filtering, drying, and milling the treated component.

5. Method for preparing a non-toxic stain inhibiting component according to claim 4, wherein said component is $TiO_2$ pigment and said aqueous stannous salt solution is added to an aqueous slurry of said $TiO_2$ pigment and the pH of the resulting mixture is adjusted by adding a neutralizing agent thereto.

6. Method for preparing a non-toxic stain inhibiting component according to claim 4, wherein said component is $TiO_2$ pigment coated with hydrous oxides selected from the group consisting of alumina, silica, titania, and mixtures thereof, and the aqueous slurry of said coated $TiO_2$ pigment is added to the aqueous solution of said stannous salt.

7. Method for preparing a non-toxic stain inhibiting component according to claim 6, wherein said stannous salt solution is stannous sulfate.

* * * * *